May 18, 1954 — W. STEENSON — 2,678,492
PASTRY CUTTER
Filed Nov. 5, 1951
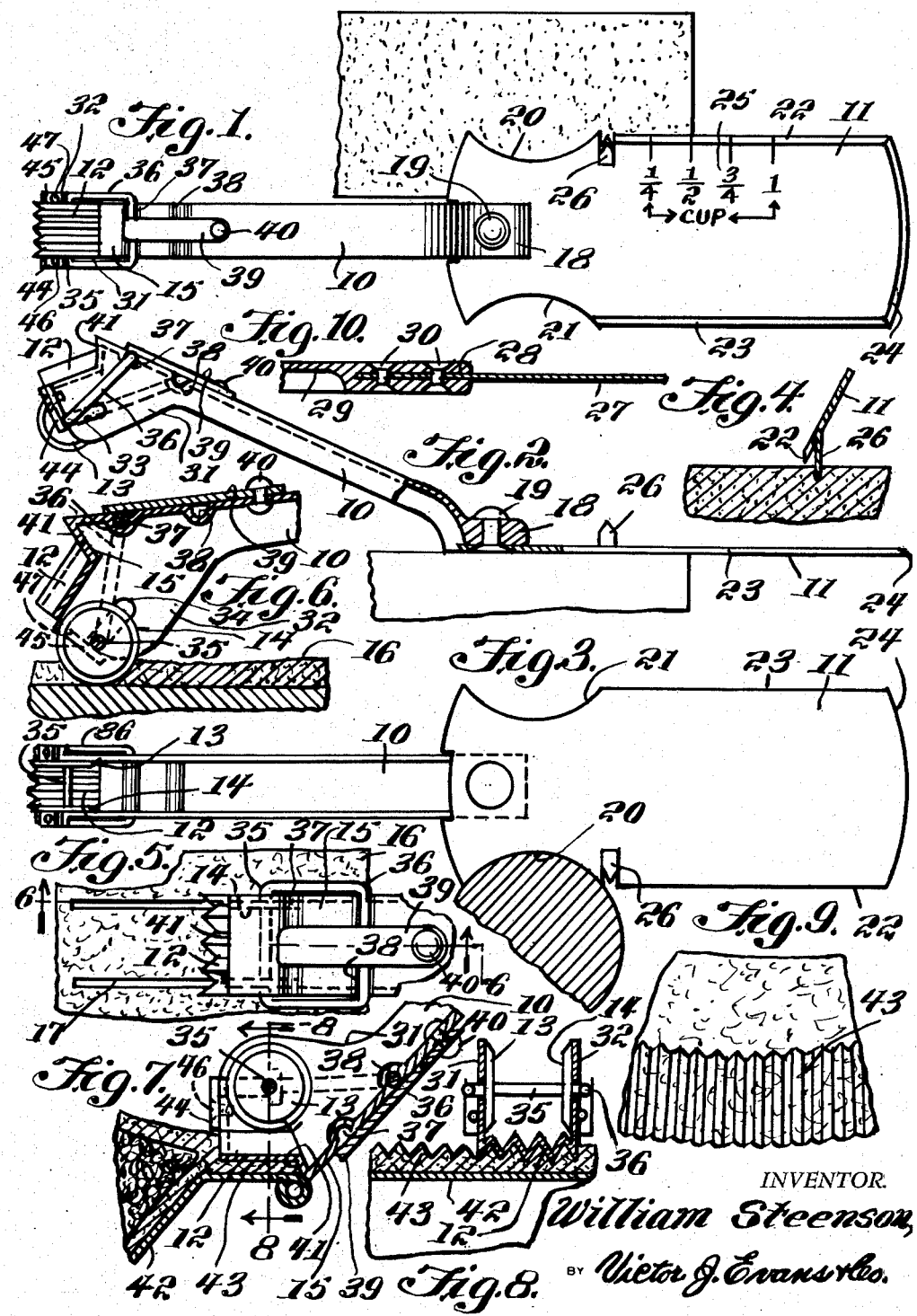
INVENTOR.
William Steenson
BY Victor J. Evans & Co.
ATTORNEYS Patented May 18, 1954

2,678,492

UNITED STATES PATENT OFFICE 2,678,492

PASTRY CUTTER

William Steenson, Seattle, Wash.

Application November 5, 1951, Serial No. 254,949

3 Claims. (Cl. 30—307)

This invention relates to cutting, scraping and crimping devices used in the kitchen, and in particular an arm having retractable cutting wheels in one end, with crimping elements in combination with the wheels, and with a scraping and cutting blade extended from the opposite end.

The purpose of this invention is to provide a complete pastry tool with which parts of ingredients may be measured, pie crust cut into strips and crimped and in which measuring devices are provided for facilitating determining the proper amount of ingredients used in the pie crust.

Various implements, tools and utensils have been provided for kitchen use, however, particularly in pie making it is desirable to provide a single implement with which the ingredients may be measured, and the pie crust cut into strips and crimped, and which may also be used for scraping dough and the like from a rolling pin. With this thought in mind this invention contemplates a complete utensil or tool having an arm with a blade extended from one end and with cutting and crimping elements, and particularly spaced rotary cutters mounted in the opposite end.

The object of this invention is, therefore, to provide a kitchen knife or cutter that is particularly adapted for pie making, that includes elements for cutting pie crust into strips, crimping the crust around the edges of a pie tin or the like, and that also includes measuring and scraping elements.

Another object of the invention is to provide a pie crust cutter and crimper and also a scraper in which the cutting and crimping elements are incorporated in the end of a single arm.

A further object of the invention is to provide a pie crust cutter and crimper which is of a simple and economical construction.

With these and other objects and advantages in view the invention embodies an arm extended angularly from a plate having arcuate and straight scraping edges and also having indicia thereon for indicating quantities of ingredients, and having, on the opposite end of the arm, spaced strip cutting wheels and crimping elements.

Other features and advantages of the invention will appear from the following description taken in connection with the drawings wherein:

Figure 1 is a plan view illustrating the improved cutting and crimping device.

Figure 2 is a side elevational view of the device with parts broken away and shown in section, showing the connection of the arm to the plate.

Figure 3 is a view looking upwardly toward the under surface of the device and illustrating a rolling pin in one of the arcuate scraping recesses thereof.

Figure 4 is a detail showing the marking and cutting prong of the device.

Figure 5 is a plan view showing the outer end of the arm with the cutting rollers in the position of cutting a strip of pie crust dough from a sheet of dough.

Figure 6 is a cross section taken on line 6—6 of Figure 5 also showing the rollers in the cutting position wherein the device is used for cutting dough into strips.

Figure 7 is a similar view illustrating the strip cutting and crimping end of the device in the inverted position wherein the device is used for crimping the edge of a pie in a pie tin or pan.

Figure 8 is a cross section taken on line 8—8 of Figure 7 also showing the pie crust crimping element.

Figure 9 is a plan view showing a section of a pie crust with the edge crimped by the device.

Figure 10 is a detail illustrating a modification wherein the scraping and measuring blade is secured in a slot in the end of a handle instead of being attached to the lower surface of the handle.

Referring now to the drawings wherein like reference characters denote corresponding parts the improved pie cutting and crimping device of this invention includes an arm 10, channel shaped in cross section, a blade 11, a crimping element 12, and a pair of rotary cutting knives 13 and 14 which are adjustably mounted in the crimping head 15 and which are positioned to cut dough 16 into strips 17.

With the parts as illustrated in Figures 1, 2 and 3, the plate or blade 11 is secured to a lug 18 on the end of the handle 10 with a rivet 19 and, as illustrated in Figure 1 the blade or plate 11 is provided with arcuate rolling pin scraping surfaces or recesses 20 and 21, straight cutting or scraping edges 22 and 23 and an arcuate scraping or cutting edge 24 which extends across the end of the blade.

The blade or plate 11 is also provided with indicia 25 with which quantities of ingredients, such as shortening, are measured from the end of a block or the like.

The blade is also provided with a marking cutter 26 which, as illustrated in Figure 4 may be used for providing a score line in the surface of the dough 16.

In the modification illustrated in Figure 10 a blade 27, similar to the blade 11 is secured in a slot 28 in the end of a handle 29 with rivets 30.

It will be understood that the blade may be attached to the handle by other suitable means.

The head 15, which is positioned at the opposite end of the arm or handle 10 from that on which the blade or plate 11 is mounted, is channel shaped in cross section having side walls 31 and 32 and the walls 31 and 32 are provided with slots 33 and 34, respectively through which a shaft 35 on which the cutters 13 and 14 are positioned is mounted. As illustrated in Figures 2 and 6, the shaft 35 is held by a yoke 36 which extends over the side walls 31 and 32 of the head and the yoke is adapted to be positioned in transversely disposed grooves 37 and 38 whereby the rotary cutters may be held in extended or retracted positions.

With the loop 36 positioned in the groove 37 the cutters are extended as shown in Figure 6 and with the loop positioned in the groove 38 the cutters are retracted, as illustrated in Figure 7.

The loop is retained in the grooves 37 and 38 with a latch 39 that is pivotally mounted on the surface of the arm 10 with a rivet 40.

The V-shaped corrugations 12 are formed in the end space of the head 15 and a wall 41 provides a stop at the inner ends of the corrugations whereby with the crimping device positioned as shown in Figure 7 the edge of the wall 41 engages the edge of a pie tin 42 limiting the inward movement of the crimping element thereby making it possible to provide a crimped band of uniform width around the edge of a pie positioned in the plate, as shown in Figure 9, the crimped band being indicated by the numeral 43.

Closure elements or latches 44 and 45 are secured to the end of the head 15 with screws 46 and 47, respectively to retain the shaft 35 in the slots 33 and 34.

It will be understood that the cutting rollers 13 and 14 may be mounted in the head by other suitable means and it will also be understood that the crimping surface 12 may be formed with corrugations of different designs and may also be located in other suitable positions in the head.

It will be understood that other modifications may be made in the design and arrangement of the parts without departing from the spirit of the invention.

What is claimed is:

1. A pie crust cutter comprising a handle with a head, channel shaped in cross section, having a back with depending side plates on one end and said side plates having aligned slots therein, a pair of circular cutting knives positioned in spaced relation in said head, a shaft extended through the slots in the side plates of the head, said cutting knives being mounted on said shaft between said side plates, transversely disposed grooves in the back of the head and a loop extended from the ends of the shaft on which the circular cutting knives are mounted and positioned to coact with said transversely disposed grooves for retaining the circular cutting knives in extended and retracted positions, and a latch pivotally mounted on the back of the head for retaining the loop in said grooves.

2. A pie crust cutter as described in claim 1, wherein said slots extend inwardly from the front edges of the side plates and means is provided for retaining the shaft in the outer ends of the slots for holding the cutting knives in extended position and in the inner ends of the slots for holding the knives in retracted positions, and latches extended across the outer end of the slots for retaining the shaft in the slots.

3. In a pie crust cutter the combination which comprises a handle with a head, channel shaped in cross section having a back with depending side plates on one end, said side plates having aligned slots therein extending inwardly from the front edges of said side plates, a shaft extended through the aligned slots of the side plate, circular cutting knives positioned against the inner surfaces of the side plates and mounted on said shaft, means retaining the shaft in the outer ends of the slots for holding the cutters in extended operative position, and means retaining the shaft in the inner ends of the slot for retaining the cutters in retracted position.

References Cited in the file of this patent

UNITED STATES PATENTS

| Number | Name | Date |
| --- | --- | --- |
| 520,173 | Wagner | May 22, 1894 |
| 677,337 | Cameron | July 2, 1901 |
| 689,331 | Stone | Dec. 17, 1901 |
| 1,356,692 | Burton | Oct. 26, 1920 |
| 1,400,383 | Stagge | Dec. 13, 1921 |
| 1,530,278 | Minneman | Mar. 17, 1925 |
| 1,530,279 | Minneman | Mar. 17, 1925 |